United States Patent
Al-Yami et al.

(10) Patent No.: US 11,530,346 B2
(45) Date of Patent: Dec. 20, 2022

(54) TREATMENT OF CALCIUM-CONTAINING BENTONITES FOR DRILLING FLUIDS

(71) Applicant: SAUDI ARABIAN OIL COMPANY, Dhahran (SA)

(72) Inventors: Abdullah Al-Yami, Dhahran (SA); Salem Alshammari, Dhahran (SA); Vikrant Wagle, Dhahran (SA); Hussain Albahrani, Dhahran (SA); Zainab Alsaihati, Dhahran (SA); Mohammad Alawami, Dhahran (SA); Ali Al-Safran, Dhahran (SA); Nasser Al-Alhareth, Dhahran (SA); Abdullah Al-Awadh, Dhahran (SA); Abdulaziz Alhelal, Dhahran (SA)

(73) Assignee: SAUDI ARABIAN OIL COMPANY

( * ) Notice: Subject to any disclaimer, the term of this patent is extended or adjusted under 35 U.S.C. 154(b) by 193 days.

(21) Appl. No.: 16/881,548

(22) Filed: May 22, 2020

(65) Prior Publication Data
US 2020/0369939 A1 Nov. 26, 2020

Related U.S. Application Data

(60) Provisional application No. 62/851,223, filed on May 22, 2019.

(51) Int. Cl.
*C09K 8/14* (2006.01)
*C04B 33/04* (2006.01)
*C04B 33/13* (2006.01)

(52) U.S. Cl.
CPC .............. *C09K 8/145* (2013.01); *C04B 33/04* (2013.01); *C04B 33/131* (2013.01); *C04B 33/1305* (2013.01)

(58) Field of Classification Search
None
See application file for complete search history.

(56) References Cited

U.S. PATENT DOCUMENTS

| | | | |
|---|---|---|---|
| 2,724,696 A | 11/1955 | Ratcliffe | |
| 3,220,946 A | 11/1965 | Turner | |
| 3,240,616 A | 3/1966 | Harasowski et al. | |

(Continued)

FOREIGN PATENT DOCUMENTS

| | | |
|---|---|---|
| CN | 105858677 A | 8/2016 |
| EP | 0770660 A1 | 5/1997 |

OTHER PUBLICATIONS

Besun et al., "Structure of starch-bentonite gels," Colloid & Polymer Science, vol. 275(4), Apr. 1, 1997: pp. 378-389.

(Continued)

*Primary Examiner* — Jeffrey D Washville
(74) *Attorney, Agent, or Firm* — Bracewell LLP; Constance Gall Rhebergen (57) ABSTRACT

Disclosed are methods of preparing drilling fluid compositions containing treated calcium bentonite. One such method includes mixing calcium bentonite with an aqueous mixture containing soda ash, followed by adding starch to form the treated bentonite mixture that is used to prepare a drilling fluid composition. Another method includes mixing the calcium bentonite with an aqueous mixture containing soda ash and magnesium oxide, followed by adding starch to form the treated bentonite mixture that is used to prepare a drilling fluid composition.

9 Claims, 9 Drawing Sheets

(56) References Cited

U.S. PATENT DOCUMENTS

| | | | |
|---|---|---|---|
| 3,408,305 A | | 10/1968 | Torok et al. |
| 3,649,547 A | | 3/1972 | Lummus et al. |
| 3,779,782 A | | 12/1973 | Erickson et al. |
| 3,909,454 A | | 9/1975 | Azrad |
| 4,242,140 A | | 12/1980 | Alther |
| 5,248,641 A | | 9/1993 | Bauer et al. |
| 5,723,416 A | | 3/1998 | Liao |
| 2009/0291859 A1 | | 11/2009 | Valls |
| 2014/0128295 A1 | * | 5/2014 | Wagles ................ C09K 8/5758 507/111 |
| 2017/0152184 A1 | * | 6/2017 | Magzoub ................ C04B 33/04 |
| 2019/0136110 A1 | * | 5/2019 | AlBahrani ................ C09K 8/04 |

OTHER PUBLICATIONS

International Search Report and Written Opinion of PCT Application No. PCT/US2020/034284 dated Sep. 4, 2020, 13 pages.

Alther, "The Effect of the Exchangeable Cations on the Physico-Chemical Properties of Wyoming Bentonites", 1986, pp. 273-284.

Bain, "A plasticity chart as an aid to the Identification and assesment of industrial clays", Clay minerals, 1971, pp. 1-17.

Egloffstein, "Natural bentonites influence of the ion exchange and partial desiccation on permeability and self-healing capacity of bentonites used in GCLs", Geotextiles and Geomembranes, 2001, pp. 427-444.

Lebedenko et al., "Some Considerations on the Ageing of Na2CO3-Activated Bentonites", Applied Clay Science, 1988, pp. 10.

\* cited by examiner

TREATMENT OF CALCIUM-CONTAINING BENTONITES FOR DRILLING FLUIDS

INCORPORATION BY REFERENCE

This application claims priority from U.S. Provisional Application No. 62/851,223, filed on May 22, 2019, the contents of which are incorporated herein in their entirety by reference.

TECHNICAL FIELD

The disclosure relates to compositions for use in drilling fluids for hydrocarbon-bearing reservoirs.

BACKGROUND

Bentonite clay is a major component in drilling fluid and has been used as a drilling mud additive in the oil and gas, geothermal, and water well drilling industries for hole cleaning, cuttings suspension, formation support, and other drilling operations. Bentonite is typically used in drilling fluid to provide rheological properties and filtration control in water-based drilling fluids. Bentonite swells with water to provide effective seals to avoid formation invasion. Bentonite is mainly composed of montmorillonite with other minerals such as sodium and calcium feldspar and quartz. The different types of bentonite are classified based on the dominant metal present in the composition, such as sodium, calcium, potassium, or aluminum. The swelling properties of calcium bentonite are different than sodium bentonite. Sodium bentonite has a greater swelling capacity as compared to the swelling capacity of calcium bentonite. Sodium bentonite can retain several times its mass of water and is often used in drilling fluids. Calcium bentonites are usually treated before their use as drilling fluids with additives, such as long-chain polyphosphates, carboxymethylcellulose, or synthetic polymers. These additives are susceptible to degradation.

SUMMARY

Embodiments of the disclosure include drilling fluid compositions containing treated calcium bentonite that overcome shortcomings in the art and provide several other advantages as disclosed here. Embodiments also include methods of preparing a treated bentonite mixture for use in a drilling fluid composition. One such method includes the steps of mixing calcium bentonite and an aqueous mixture containing soda ash to form a first bentonite mixture, followed by the addition of starch to the first bentonite mixture to form a second bentonite mixture. The final step includes the step of adjusting pH of the second bentonite mixture to a pH greater than 10 by addition of sodium hydroxide to form a treated bentonite mixture. In certain embodiments, a method of preparing a drilling fluid composition includes the step of adding a dispersant to the treated bentonite mixture before adjusting the pH. This method can also include the step of adding one or more of a weighting agent, a fluid loss-control agent, a corrosion inhibitor, and derivatives thereof to the drilling fluid composition. In an embodiment, the step of mixing calcium bentonite and the aqueous mixture does not involve addition of hydroxide compounds. In an embodiment, the step of mixing calcium bentonite and the aqueous mixture does not involve addition of heavy metal salts. The calcium bentonite can contain greater than 20 weight percent (wt %) of quartz. The calcium bentonite can contain kaolinite or hematite, or both. In certain embodiments, the calcium bentonite contains 64 wt % of sodium montmorillonite, 3 wt % of illite, 9 wt % of kaolinite, 21 wt % of quartz, 1 wt % of calcite and 2 wt % of hematite. In certain embodiments, the calcium bentonite contains 67 wt % of sodium montmorillonite, 10 wt % of kaolinite, and 23 wt % of quartz. In certain embodiments, the calcium bentonite contains 56 wt % of sodium montmorillonite, 4 wt % of illite, 8 wt % of kaolinite, 21 wt % of quartz, 2 wt % of albite and 9 wt % of hematite.

In another embodiment, the method of preparing a treated bentonite mixture for use in a drilling fluid composition includes the steps of mixing calcium bentonite and an aqueous mixture containing soda ash and magnesium oxide to form a first bentonite mixture, followed by the step of adding starch to the first bentonite mixture to form a second bentonite mixture, and adjusting pH of the second bentonite mixture to a pH greater than 10 by addition of sodium hydroxide to form a treated bentonite mixture. In certain embodiments, a method of preparing a drilling fluid composition includes the step of adding a dispersant to the treated bentonite mixture before adjusting the pH. In an embodiment, the step of mixing calcium bentonite and the aqueous mixture of soda ash does not involve addition of hydroxide compounds or heavy metal salts. In certain embodiments, the calcium bentonite contains greater than 20 wt % of quartz. In certain embodiments, the calcium bentonite contains kaolinite or hematite or both. In certain embodiments, the calcium bentonite contains 64 wt % of sodium montmorillonite, 3 wt % of illite, 9 wt % of kaolinite, 21 wt % of quartz, 1 wt % of calcite and 2 wt % of hematite. In certain embodiments, the calcium bentonite contains 67 wt % of sodium montmorillonite, 10 wt % of kaolinite, and 23 wt % of quartz. In certain embodiments, the calcium bentonite contains 56 wt % of sodium montmorillonite, 4 wt % of illite, 8 wt % of kaolinite, 21 wt % of quartz, 2 wt % of albite and 9 wt % of hematite.

Numerous other aspects, features and benefits of the present disclosure may be made apparent from the following detailed description taken together with the tables and figures. The systems can include less components, more components, or different components depending on desired goals for the drilling fluids containing bentonite.

BRIEF DESCRIPTION OF DRAWINGS

The features, aspects, and advantages of the present disclosure are illustrated with regard to the following description and accompanying drawings. It is to be noted, however, that the drawings illustrate only several embodiments of the disclosure and are therefore not to be considered limiting of the disclosure's scope.

The bentonite sample used for FIGS. 4A and 4B were obtained at 5 meters below the ground surface of the mining pit of FIG. 1.

DETAILED DESCRIPTION

The present disclosure describes various embodiments related to compositions and methods of making and using drilling fluids containing treated local bentonites. In the following description, numerous specific details are set forth in order to provide a thorough understanding of the various embodiments. In other instances, well-known processes and methods may not be described in particular detail in order not to unnecessarily obscure the embodiments described here. Additionally, illustrations of embodiments here may omit certain features or details in order to not obscure the embodiments described here. In the following detailed description, reference is made to the accompanying drawings that form a part of the specification. Other embodiments may be used, and logical changes may be made without departing from the scope of the disclosure. Therefore, the following detailed description is not to be taken in a limiting sense. The description may use the phrases "in some embodiments," "in various embodiments," "in certain embodiment," or "in embodiments," which may each refer to one or more of the same or different embodiments. Furthermore, the terms "comprising," "including," "having," and the like, as used with respect to embodiments of the present disclosure, are synonymous.

Bentonite is an absorbent aluminum phyllosilicate, essentially an impure clay containing montmorillonite. Certain characteristics of bentonite include negative electric charge ranging from 80 to 150 milliequivalents (meq) per one hundred grams (g), particle size ranging from 10-100 micrometers (μm), specific surface area ranging from 100-800 square meters per gram ($m^2/g$), and sensitivity to hydration, as demonstrated by the ability to swell as much as twenty times its own volume in the presence of water. The role of bentonites in drilling fluids include the control of the flow properties and the filtration rate of drilling fluids in drilling operations.

Disclosed here are embodiments of water-based drilling fluid compositions containing calcium bentonite. One such composition contains calcium bentonite treated with soda ash. Another such composition contains calcium bentonite treated with soda ash and magnesium oxide. Certain embodiments of the water-based drilling fluid compositions also contain starch and sodium hydroxide. In certain embodiments, these water-based drilling fluid compositions include a dispersant. Examples of suitable dispersants include sodium phosphates or sodium carbonates. In certain embodiments, these water-based drilling fluid compositions include one or more of a weighting agent, a fluid loss-control agent, a corrosion inhibitor, and derivatives thereof. In certain embodiments, these water-based drilling fluid compositions are prepared without the use of hydroxides or heavy metal salts in treatment of the calcium bentonite. Examples of heavy metal salts include salts of iron, nickel, zinc, cobalt, chromium, and manganese.

Disclosed here are embodiments of water-based drilling fluid compositions containing specific bentonites. In certain embodiments, the bentonite used in these drilling fluid compositions are bentonites local to the Kingdom of Saudi Arabia, referred here as "local bentonites." In certain embodiments, the local bentonites are calcium bentonites. The local bentonite can contain greater than 20 wt % of quartz. The local bentonite can contain one or both of kaolinite and hematite. In an embodiment, the local bentonite can contain 64 wt % of sodium montmorillonite, 3 wt % of illite, 9 wt % of kaolinite, 21 wt % of quartz, 1 wt % of calcite and 2 wt % of hematite. In another embodiment, the local bentonite can contain 67 wt % of sodium montmorillonite, 10 wt % of kaolinite, and 23 wt % of quartz. In another embodiment, the local bentonite can contain 56 wt % of sodium montmorillonite, 4 wt % of illite, 8 wt % of kaolinite, 21 wt % of quartz, 2 wt % of albite and 9 wt % of hematite. In certain embodiments, the local bentonites do not contain gypsum. In certain embodiments, the local bentonites do not contain cristobalite. As used here, when a composition "does not contain" a component, it means that component is present in such small amounts in the composition that it is not detected by currently commercially available assays.

Figure 1:
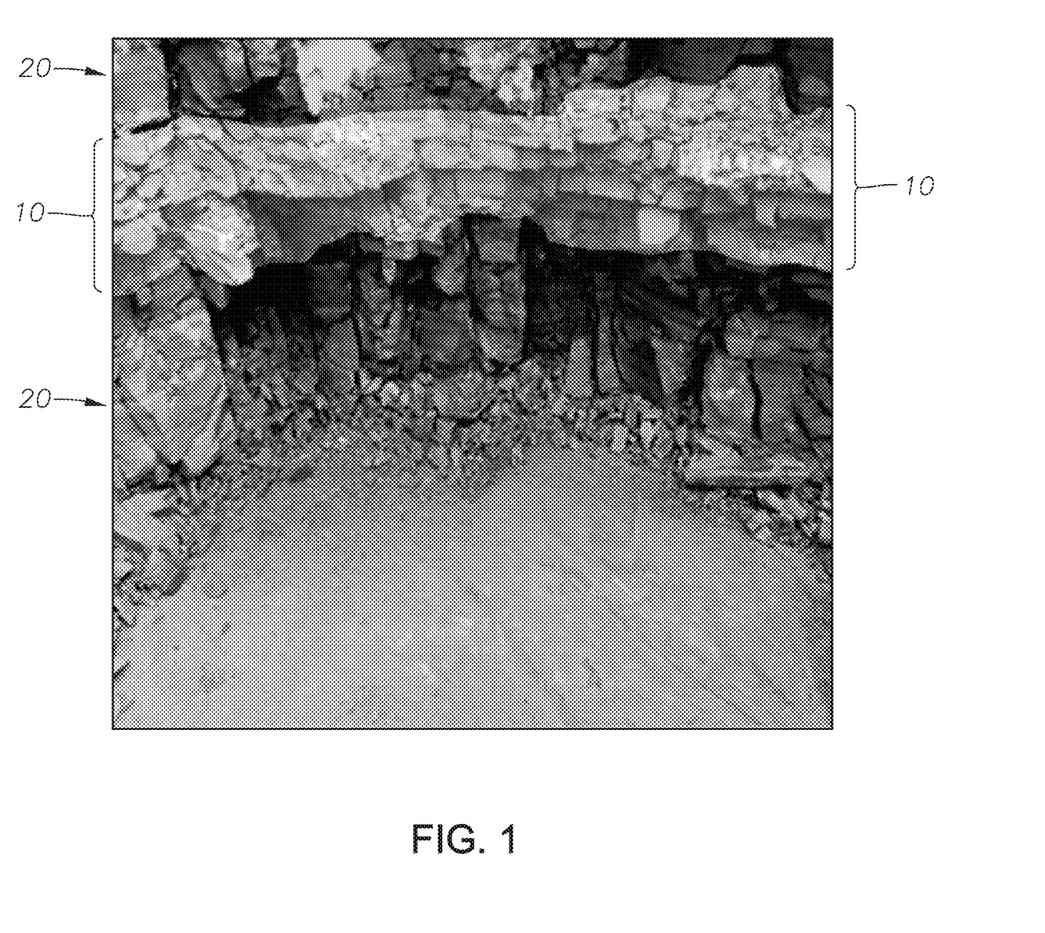
FIG. 1 is a photograph of a mining pit revealing the bentonite beds at the Khulays Formation in western Saudi Arabia.

Bentonite is mined from the earth. FIG. 1 is a photographic representation of a mining pit revealing bentonite beds at the Khulays Formation in western Saudi Arabia. The bentonite samples used in the studies here are part of the tertiary aged stratigraphic units of probably Oligocene or late Eocene epochs. The Khulays Formation is subdivided into three geological units: upper sandstone and silty clay, bentonite beds, and lower sandstone and silty red clay. The bentonite bed 20 is grey to pale brown in color and it is sandwiched between the upper and lower sandstone and silty clay units. Samples of local bentonite were obtained at 5 meters and 7 meters below the ground surface, and from the orange laminar layer 10. Physical and chemical properties of several samples of local bentonites and a bentonite that meets the American Petroleum Institute's standards for making drilling fluids ("reference bentonite") were evaluated using different analytical techniques, such as wavelength dispersive X-ray fluorescence spectrometry (WDXRF), X-ray powder diffraction (XRD), environmental scanning electron microscope (ESEM), and energy-dispersive X-ray spectroscopy (EDS).

Several samples of local bentonites were analyzed using WDXRF with the reference bentonite serving as the base for evaluating the local bentonite samples. The samples were prepared as follows. About 4 grams of each of the samples was mixed well and homogenized with 0.9 grams (g) of binder (Licowax® C micropowder PM (from Clariant AG headquartered in Muttenz, Switzerland)). The resultant mixture was pressed with a 20-ton hydraulic laboratory pellet press to form pellets of about 31 millimeters (mm) in diameter. The WDXRF analysis was performed using the Omnian® standardless analysis protocol (available from Malvern Panalytical headquartered in Malvern, United Kingdom) on a PANalytical WDXRF spectrometer. Table 1 presents the elemental composition of the reference bentonite, expressed as weight percent (wt %) in the several samples of local bentonites.

TABLE 1

| Element | API reference (wt %) | Five meters (wt %) | Seven meters (wt %) | Orange laminar (wt %) |
|---|---|---|---|---|
| Si | 33.9 | 26.6 | 28.0 | 22.5 |
| Al | 9.1 | 10.9 | 9.7 | 9.3 |
| Fe | 3.0 | 7.9 | 7.6 | 16.8 |
| Na | 1.4 | 1.5 | 1.8 | 1.5 |
| Mg | 1.0 | 1.4 | 1.2 | 1.3 |
| Ca | 0.8 | 1.4 | 1.1 | 1.0 |
| K | 0.3 | 0.7 | 0.7 | 0.6 |
| S | 0.2 | — | 0.03 | 0.02 |
| Cl | 0.1 | — | 1.9 | 1.6 |
| Ti | 0.1 | 1.3 | 1.1 | 1.0 |

The local bentonites are classified as calcium bentonites because the local bentonites contain greater calcium levels as compared to sodium than the American Petroleum Institute (API) reference bentonite. The iron content of the local bentonite samples was 1.5 to 5 times greater than the iron content of the reference bentonite. The silicon content of the local bentonite samples was 17% to 34% lesser than the silicon content of the reference bentonite. The calcium content of the local bentonite samples was 25% to 75% greater than the calcium content of the reference bentonite, while the sodium content of the local bentonite samples was 7% to 29% greater than the sodium content of the reference bentonite. Magnesium oxide was added to the drilling fluid compositions containing the local bentonite to act as an alkaline buffer and maintain the pH of the drilling fluid composition. And, the soda ash was added to stabilize the pH of the drilling fluid composition and achieve the required cation exchange.

Several samples of local bentonite were analyzed using XRD, an analytical technique used for identification of clay minerals. The samples were prepared as follows. The samples were ground for several minutes using a mill machine (Mortar Grinder RM 200 from Retsch GmbH headquartered in Haan, Germany) to achieve a powder with a particle size (10-100 µm). The samples were mounted into the XRD sample holder by back pressing. A sample of bentonite containing known concentration of components was subject to the XRD analysis and the content of individual components was determined by area under the peaks, as the areas and peaks correspond to known values of the clay components. Table 2 provides XRD data comparing the compositions of the local bentonite samples and the reference bentonite. Diffraction patterns were compared with standards for identification of minerals.

The local bentonites are classified as calcium bentonites as they contain calcium montomorillonite. The XRD spectra of bentonite samples does not differentiate between sodium montmorillonite and calcium montmorillonite in the bentonite samples. Therefore, the XRD spectra appears to reveal the presence of sodium montmorillonite only. However, elemental analysis shows the presence of calcium, from calcium montomorillonite. The WDXRF results confirm the presence of calcium. The weight percent ratio of calcium to sodium is 0.57 in the API reference sample and this is the target ratio of calcium to sodium to be achieved by the treatment process of local bentonite. The untreated local bentonite (5 meters) has a ratio of 0.93, which is greater than the ratio of the API bentonite. The orange laminar and the 7 meters samples have ratios of 0.67 and 0.61, respectively.

TABLE 2

| Mineral | API reference (wt %) | Five meters (wt %) | Seven meters (wt %) | Orange laminar (wt %) |
|---|---|---|---|---|
| Na-montmorillonite [$Na_{0.3}Al_2(Si, Al)_4O_{10}(OH)_2 \cdot 2H_2O$] | 85 | 64 | 67 | 56 |
| Illite [$KAl_2(Si_3Al)O_{10}(OH)_2$] | 2 | 3 | — | 4 |
| Kaolinite [$Al_2Si_2O_5(OH)_4$] | — | 9 | 10 | 8 |
| Cristobalite ($SiO_2$) | 5 | — | — | — |
| Quartz ($SiO_2$) | 2 | 21 | 23 | 21 |
| Albite ($NaAlSi_3O_8$) | 3 | — | — | 2 |
| Calcite ($CaCO_3$) | 1 | 1 | — | — |
| Gypsum ($CaSO_4 \cdot 2H_2O$) | 2 | — | — | — |
| Hematite ($Fe_2O_3$) | — | 2 | — | 9 |

The sodium-montmorillonite content was the least in the bentonite sample obtained from the orange laminar layer, as compared to the bentonite samples obtained at 5 meters and 7 meters below the ground surface. The sodium-montmorillonite content of the local bentonite samples was 21-34% lesser than the sodium-montmorillonite content of the reference bentonite. The kaolinite content of the local bentonite samples was 8-10 wt %, while there was negligible presence of kaolinite in the reference bentonite. The quartz content of the local bentonite samples was ten times greater than the quartz content of the reference bentonite. Sample from the orange laminar layer had 9 wt % of iron oxides and those obtained at 7 meters below the ground surface had about 2 wt % of iron oxides. Samples obtained at 5 meters below the ground surface and the reference bentonite do not contain iron oxides as determined by the XRD analysis.

Several samples of local bentonite were analyzed using ESEM, an analytical technique used to study the surface of the bentonite samples and collect electron micrographs. The environmental scanning electron microscope was equipped with an energy-dispersive X-ray spectrometer. The elemental composition of each sample was determined by the EDS analysis. For ESEM and EDS analyses, the samples were prepared as follows. The samples were mounted on ESEM holders provided with double-sided carbon tape, and then were inserted into the microscope chamber for analysis. The ESEM microscope was operated at 15 kilovolts (kV), 0.15-0.45 Torr water vapor pressure and around 10 mm working distance. Qualitative EDS elemental compositional analyses were performed in general area and spot analysis modes.

Figure 2A:
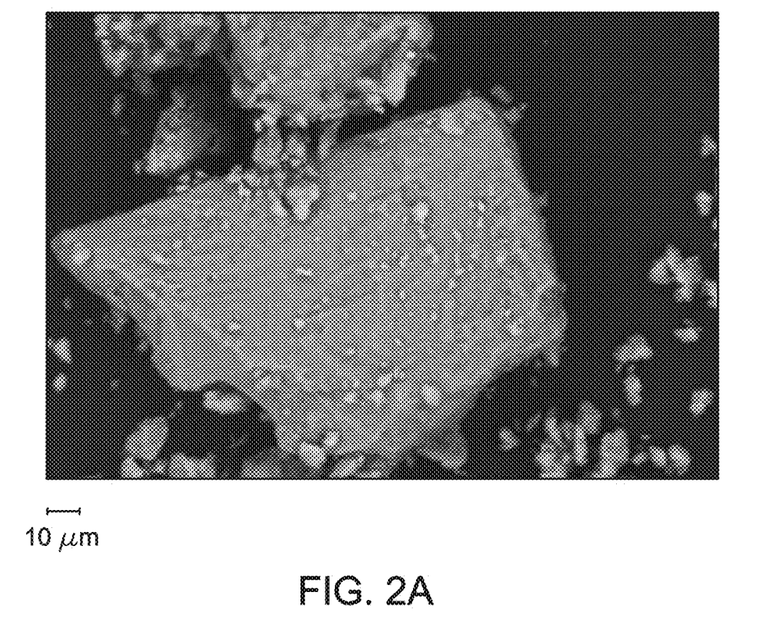
FIGS. 2A and 2B are images of the reference bentonite obtained by environmental scanning electron microscope (ESEM) at resolving magnifications of 1370× (general area analysis) and 3580× (spot analysis), respectively.
Figure 2B:
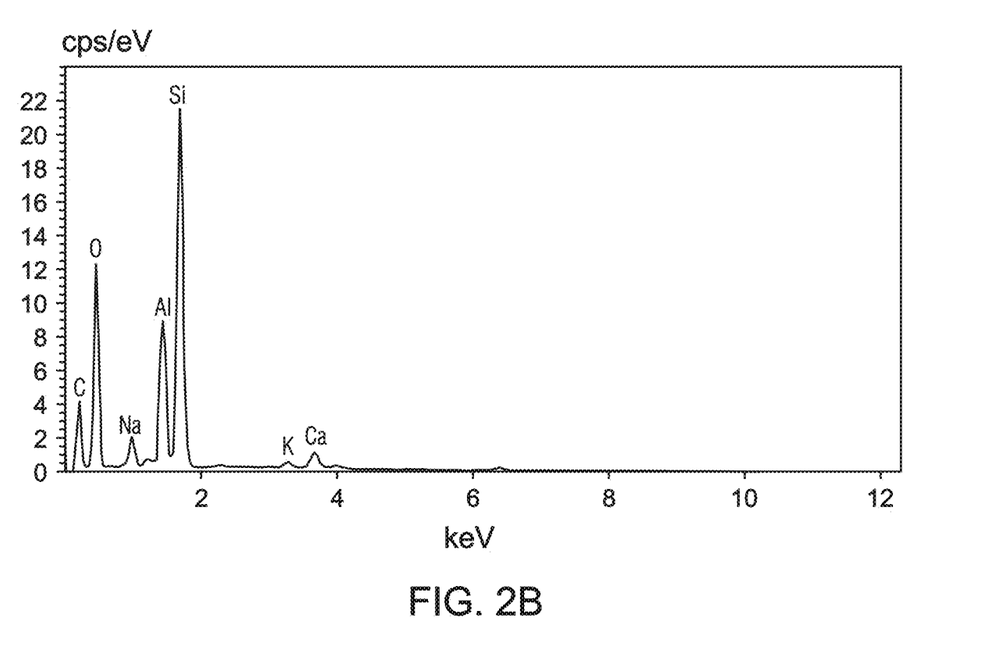
Figure 3:
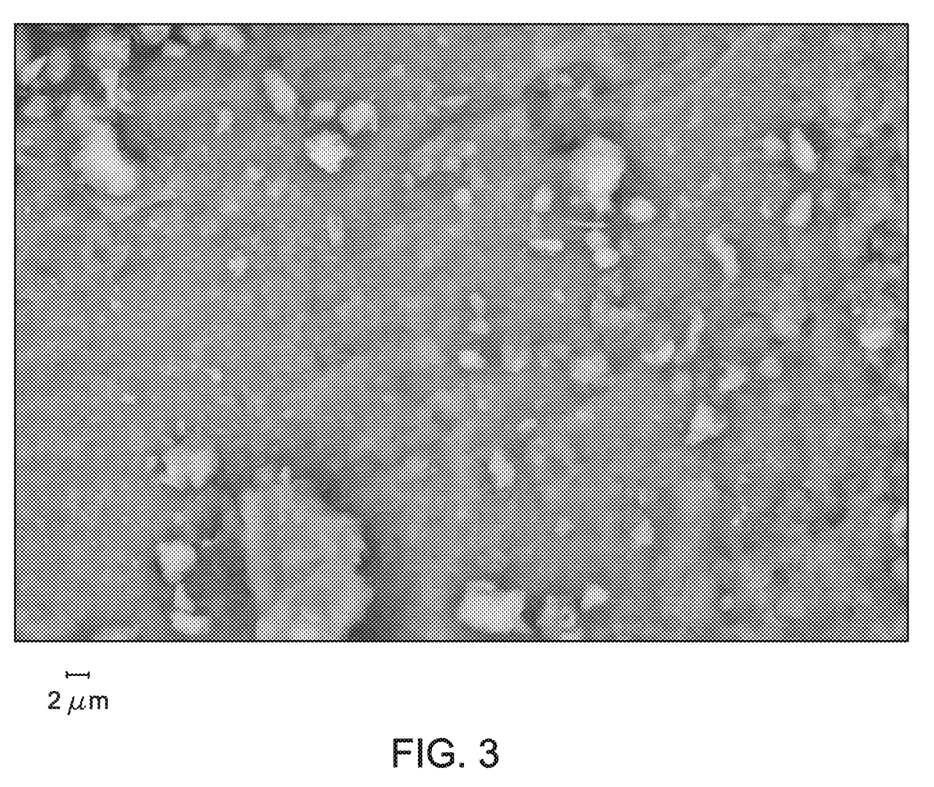
FIG. 3 is the energy-dispersive X-ray spectroscopy (EDS) spectrum of the reference bentonite obtained by ESEM at resolving magnification of 1370× (general area analysis).

FIGS. 2A and 2B are ESEM images of the reference bentonite at resolving magnifications of 1370× (general area analysis) and 3580× (spot analysis), respectively. ESEM images showed the reference bentonites has a flaky or crenulated morphology. FIG. 3 is the EDS spectrum of the reference bentonite obtained by ESEM at resolving magnifications of 10 µm (general area analysis). As expected, the reference bentonite contains mainly silicon, oxygen, and aluminum along with sodium, calcium, and potassium.

Figure 4A:
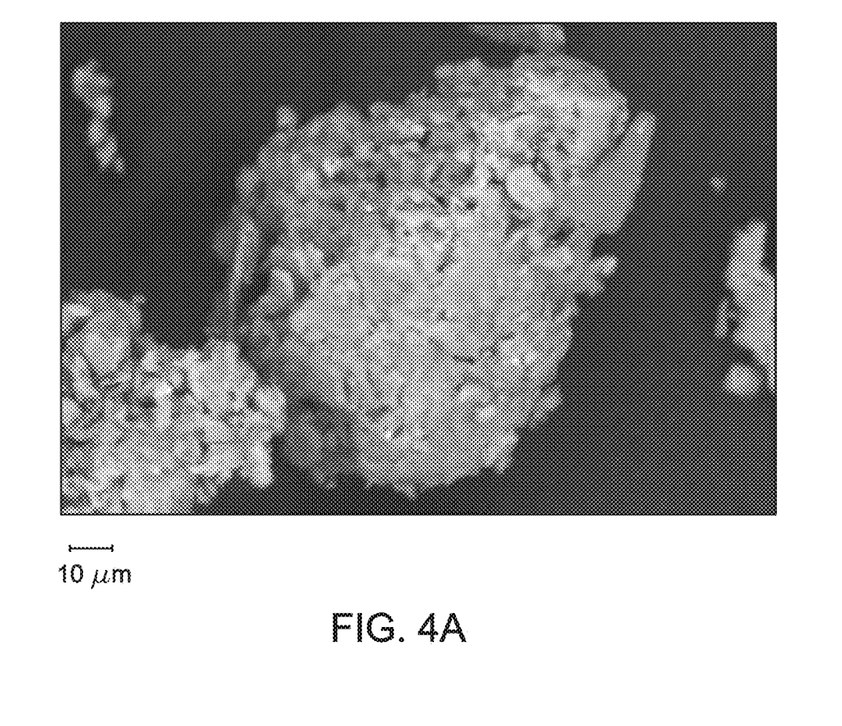
FIGS. 4A and 4B are ESEM images of the bentonite samples obtained at resolving magnifications of 1790× (general area analysis) and 13610× (spot analysis), respectively.
Figure 4B:
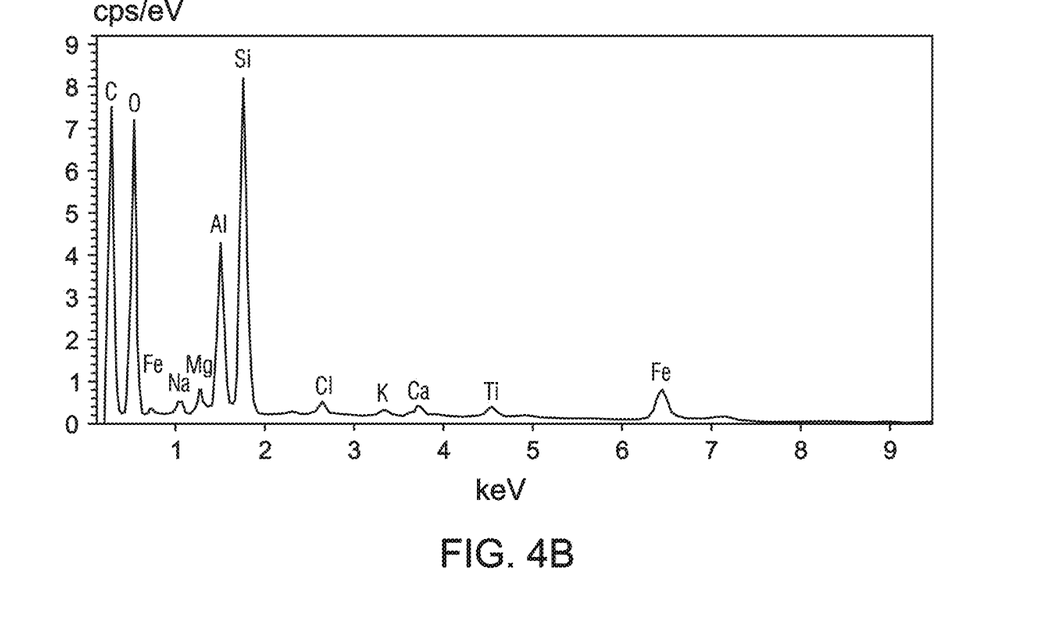
Figure 5:
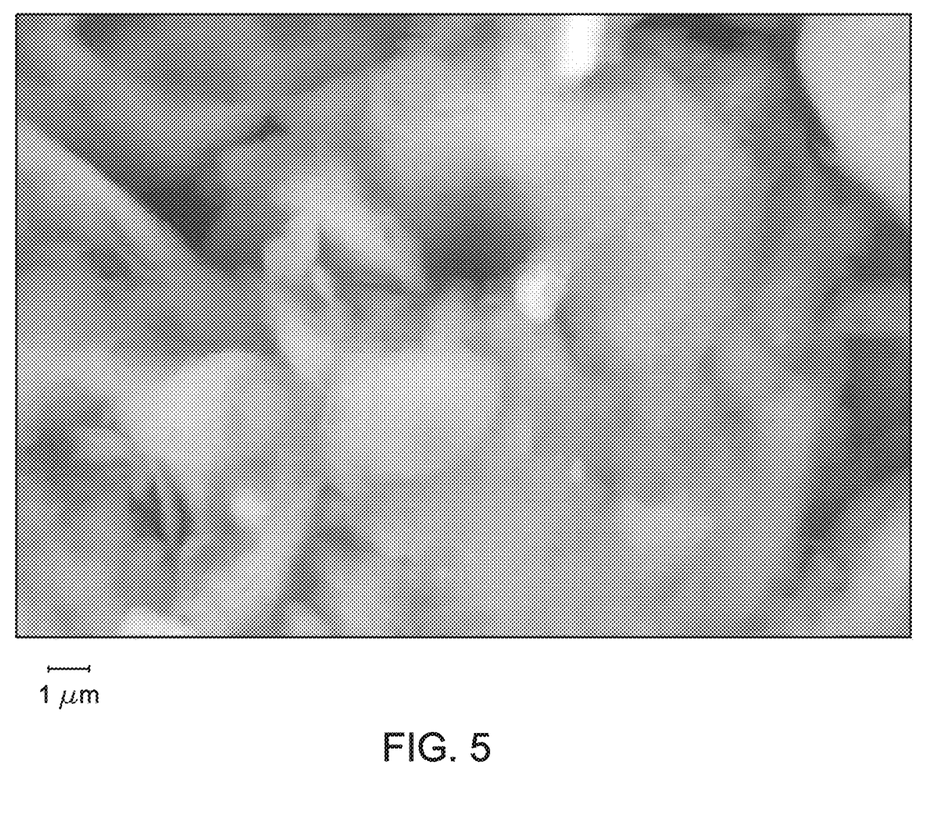
FIG. 5 is the EDS spectrum from the general area ESEM analysis of the bentonite sample obtained at 5 meters below the ground surface of the mining pit of FIG. 1.

FIGS. 4A and 4B are ESEM images of the bentonite samples obtained at resolving magnifications of 1790× (general area analysis) and 13610× (spot analysis), respectively. The bentonite sample used for FIGS. 4A and 4B were obtained at 5 meters below the ground surface of the mining pit. This bentonite sample containing Na-montmorillonite had a flaky or crenulated morphology. FIG. 5 is the EDS spectrum from the general area ESEM analysis of the bentonite sample obtained at 5 meters below the ground surface of the mining pit. This bentonite sample contains mainly silicon, oxygen, and aluminum, along with sodium and potassium. As compared to the reference bentonite, this bentonite sample obtained at 5 meters below the ground surface contains increased amounts of calcium and iron. The elemental analysis was confirmatory of the results from the WDXRF analysis.

Figure 6A:
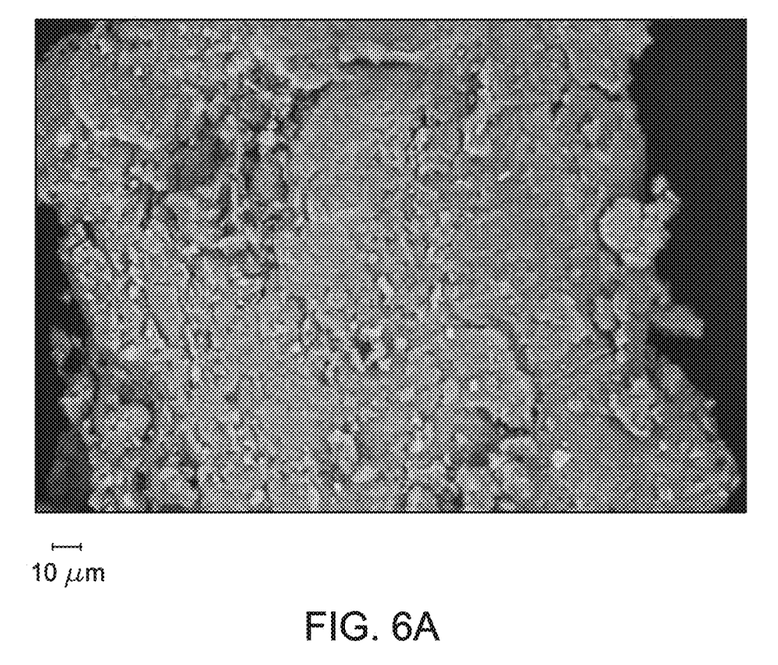
FIGS. 6A and 6B are ESEM images of the bentonite samples obtained at resolving magnifications of 1210× (general area analysis) and 3290× (spot analysis), respectively. The bentonite sample used for FIGS. 6A and 6B were obtained at 7 meters below the ground surface of the mining pit of FIG. 1.
Figure 6B:
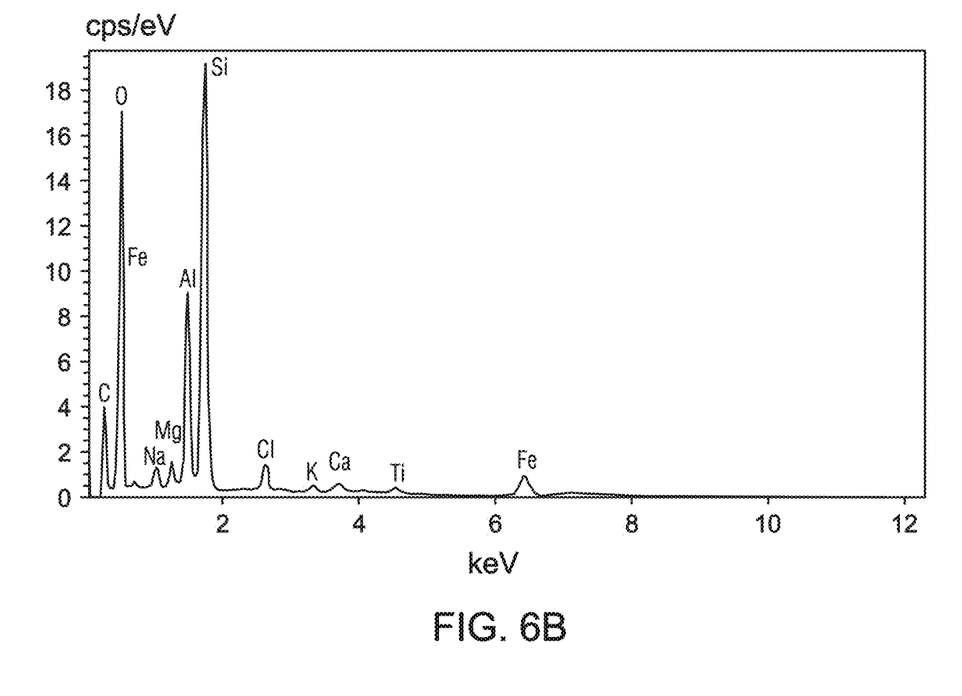
Figure 7:
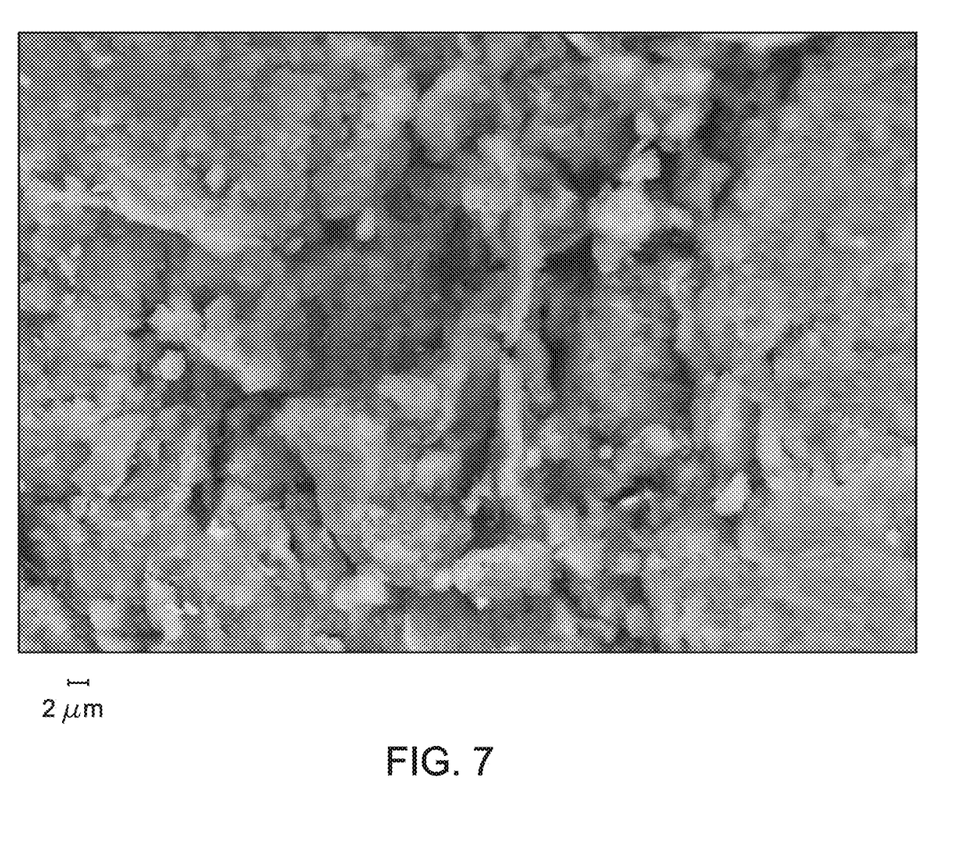
FIG. 7 is the EDS spectrum from the general area ESEM analysis of the bentonite sample obtained at 7 meters below the ground surface of the mining pit of FIG. 1.

FIGS. 6A and 6B are ESEM images of the bentonite samples obtained at resolving magnifications of 1210× (general area analysis) and 3290× (spot analysis), respectively. The bentonite sample used for FIGS. 6A and 6B were obtained at 7 meters below the ground surface of the mining pit. This bentonite sample containing Na-montmorillonite had a flaky or crenulated morphology. FIG. 7 is the EDS spectrum from the general area ESEM analysis of the bentonite sample obtained at 7 meters below the ground surface of the mining pit. This bentonite sample contains mainly silicon, oxygen, and aluminum, along with sodium and potassium. As compared to the reference bentonite, this bentonite sample obtained at 7 meters below the ground surface contains increased amounts of calcium and iron. The elemental analysis was confirmatory of the results from the WDXRF analysis.

Figure 8A:
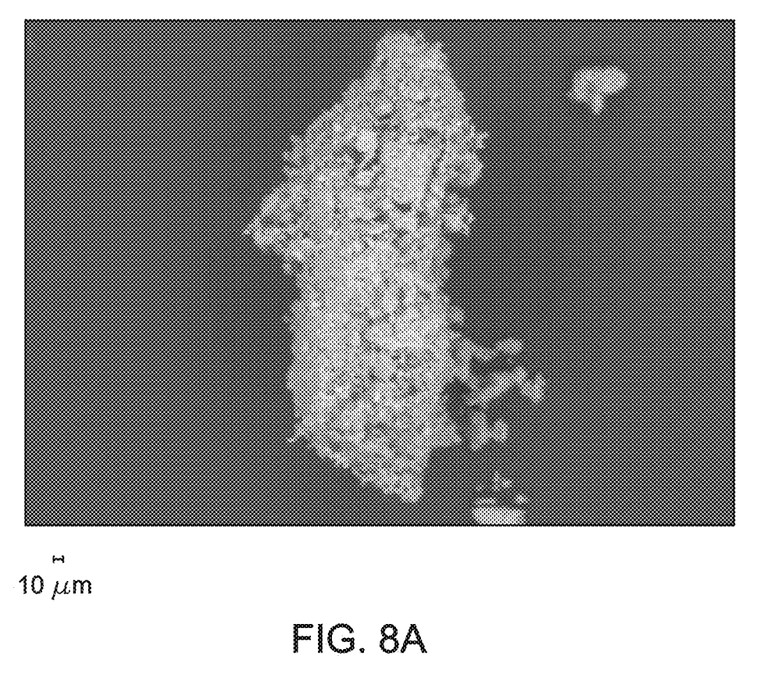
FIGS. 8A and 8B are ESEM images of the bentonite samples obtained at resolving magnifications of 379× (general area analysis) and 3290× (spot analysis), respectively. The bentonite sample used for FIGS. 8A and 8B were obtained from the orange laminar layer of the mining pit of FIG. 1.
Figure 8B:
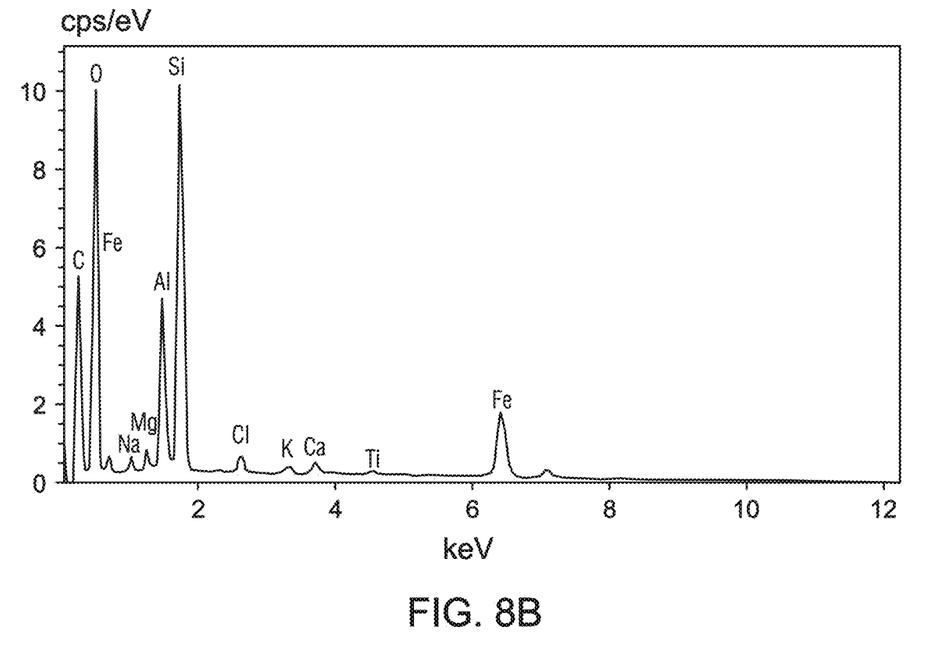
Figure 9:
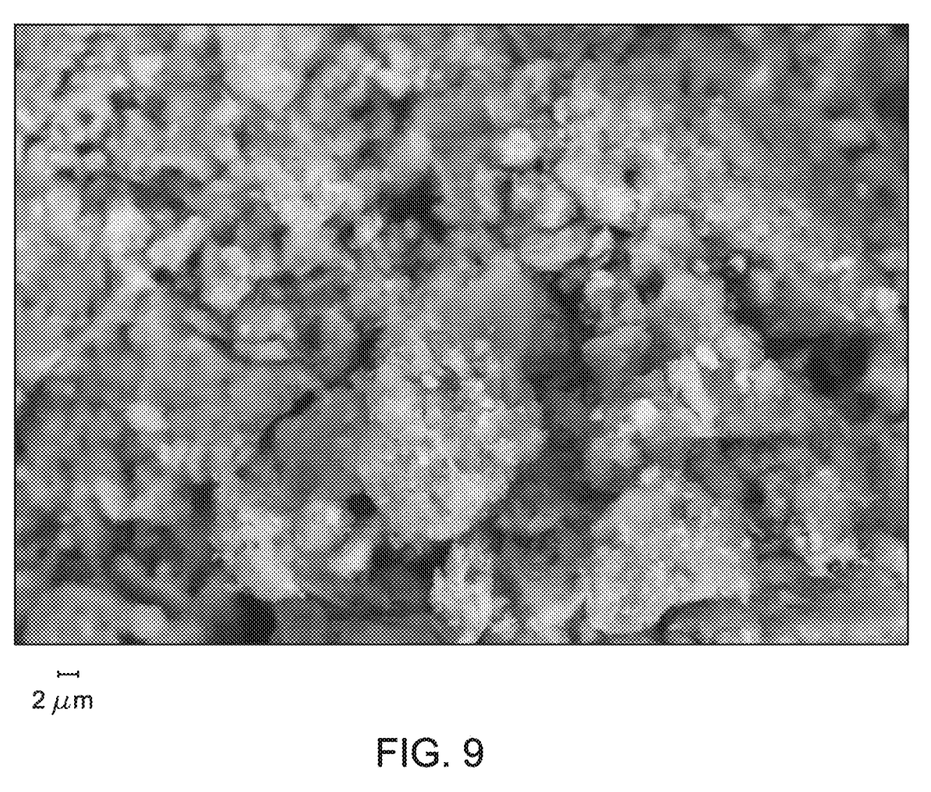
FIG. 9 is the EDS spectrum from the general area ESEM analysis of the bentonite sample obtained from the orange laminar layer of the mining pit of FIG. 1.

FIGS. 8A and 8B are ESEM images of the bentonite samples obtained at resolving magnifications of 379× (general area analysis) and 3290× (spot analysis), respectively. The bentonite sample used for FIGS. 8A and 8B were obtained from the orange laminar layer of the mining pit. This bentonite sample containing Na-montmorillonite had a flaky or crenulated morphology. FIG. 9 is the EDS spectrum from the general area ESEM analysis of the bentonite sample obtained from the orange laminar layer of the mining pit. This bentonite sample contains mainly silicon, oxygen, and aluminum, along with sodium and potassium. As compared to the reference bentonite, this bentonite sample from the orange laminar layer contains increased amounts of calcium and iron. The elemental analysis was confirmatory of the results from the WDXRF analysis.

Disclosed here are embodiments of methods of preparing drilling fluid compositions containing calcium bentonite. One such method includes the steps of mixing calcium bentonite and an aqueous mixture containing soda ash to form a first bentonite mixture, adding starch to the first bentonite mixture to form a second bentonite mixture, and adjusting pH of the second bentonite mixture to a pH greater than 10 by addition of sodium hydroxide crystals. Another such method includes the steps of mixing calcium bentonite and an aqueous mixture containing soda ash and magnesium oxide to form a first bentonite mixture; adding starch to the treated bentonite mixture to form a second bentonite mixture; and adjusting pH of the second bentonite mixture to a pH greater than 10 by addition of sodium hydroxide crystals. In certain embodiments, the step of mixing calcium bentonite and the aqueous mixture does not involve addition of hydroxide compounds or heavy metal salts. These methods can further include the step of adding a dispersant to the treated bentonite mixture before adjusting the pH to form the drilling fluid composition. These methods can further include the step of adding one or more of a weighting agent, a fluid loss-control agent, a corrosion inhibitor, and derivatives thereof to the drilling fluid composition. In certain embodiments, no hydroxide compounds are used to prepare the treated bentonite mixture. Sodium hydroxide is added to adjust the pH of the drilling fluid composition. In certain embodiments, no heavy metal salts are used in treatment of the calcium bentonite.

The bentonite used in certain embodiments of drilling fluid compositions can contain greater than 20 wt % of quartz. The bentonite used in certain embodiments of drilling fluid compositions can contain one or both of kaolinite and hematite. The bentonite used in certain embodiments of drilling fluid compositions can contain 64 wt % of sodium montmorillonite, 3 wt % of illite, 9 wt % of kaolinite, 21 wt % of quartz, 1 wt % of calcite and 2 wt % of hematite. In certain embodiments, the calcium bentonite contains 67 wt % of sodium montmorillonite, 10 wt % of kaolinite, and 23 wt % of quartz. In certain embodiments, the calcium bentonite contains 56 wt % of sodium montmorillonite, 4 wt % of illite, 8 wt % of kaolinite, 21 wt % of quartz, 2 wt % of albite and 9 wt % of hematite.

Performance of the drilling fluids containing bentonite can be altered by treatment of the bentonite and the addition of different components, such as soda ash, magnesium oxide, starch, and sodium hydroxide. Certain embodiments of the water-based drilling fluids contain treated bentonite, soda ash, sodium hydroxide, thinners, barite, and starch. In certain embodiments, the water-based drilling fluid contains 1 to 50 pounds per barrel (ppb) of local bentonite treated with 0.5 to 10 ppb of soda ash. In certain embodiments, the water-based drilling fluid contains 30 to 50 ppb of local bentonite treated with 4 to 10 ppb of soda ash. In certain embodiments, the water-based drilling fluid contains treated bentonite and sodium hydroxide ranging from 0.2 to 5.0 ppb. In certain embodiments, the water-based drilling fluid contains treated bentonite and sodium hydroxide ranging from 0.2 to 0.35 ppb. In certain embodiments, the water-based drilling fluid contains treated bentonite and a thinner, such as barite, ranging from 0.5 to 2 ppb. In certain embodiments, the water-based drilling fluid contains treated bentonite and a thinner, such as barite, ranging from 1.5 to 2 ppb. In certain embodiments, the water-based drilling fluid contains treated bentonite and a modified starch ranging from 0.5 to 5 ppb. In certain embodiments, the water-based drilling fluid contains treated bentonite and a modified starch ranging from 2 to 3 ppb. The required amount of barite and water depend on the final density of the formulation needed. The densities for the drilling fluid compositions described here range from 62 pounds per cubic foot (pcf) to 165 pcf. To achieve these densities, water in the composition ranges from 130 ppb to 305 ppb and barite in the composition ranges from 14 ppb to 750 ppb.

An aqueous drilling fluid composition containing bentonite and having the properties shown in Table 3 performed as desired under experimental conditions involving a gas well with a 42" hole section. Therefore, the drilling fluid compositions with the treated local bentonites were formulated to deliver similar properties as shown in Table 3.

TABLE 3

| Property | Value | Unit |
| --- | --- | --- |
| Density | 64-67 | Pcf |
| Mud Funnel Viscosity | 60-120 | Seconds |
| pH | 10 | None |
| Plastic Viscosity | As small as possible | Centipoise (cP) |
| Yield Point | 25-35 | Pounds per 100 square feet (lbs/100 ft$^2$) |

In addition to the treated local bentonites, the drilling fluids described in this disclosure can contain one or more dispersants. Examples of suitable dispersants include sodium phosphates or sodium carbonates. In certain embodiments, the dispersants can be aided by heat or mechanical shearing. In addition to the treated local bentonites, the drilling fluids described in this disclosure can contain natural or synthetic polymers, weighting agents, fluid loss-control agents, a dispersant, a corrosion inhibitor, thinner, thickener, a viscosifier, or a defoamer. Examples of weighting agents used in these embodiments include, without limitations, solid materials of density ranging from 2.5 to 5.5 grams per cubic centimeter ($g/cm^3$) that stay suspended in a slurry, such as barite, hematite, calcium carbonate, siderite, or ilmenite. Examples of fluid loss-control agents used in these embodiments include, without limitations, starches, modified starches, cellulose, modified cellulose, synthetic polymers, such as sulfonated co- and ter-polymers, polyacrylates, polyacrylamides, and lignites, and combinations thereof. Modified starches or modified cellulose include one or more of carboxylated, carbonylated, sulfonated, or other acid or alcohol modified starch or cellulose. Examples of thinners used to reduce viscosity and gel strength in these embodiments include, without limitations, lignosulfonates, polyphosphates, small molecular weight polyacrylates (with number average molecular weight of 1000-6000 grams per mole), sulfonated polymers, phosphonic polymers, acrylic comb polymers, and other synthetic polymers. Examples of corrosion inhibitors used in these embodiments include, without limitations, chemical scavengers of oxygen, carbon dioxide, or hydrogen sulfide. A variety of surfactants serve as emulsifiers, foamers and defoamers, wetting agents and lubricants.

Selective rheological properties of a drilling fluid are predictive as to how the fluid will perform for drilling purposes. These properties include plastic viscosity (PV), yield point (YP), gel strength, particle size, and fluid loss control. Plastic viscosity (PV) is obtained from the Bingham-Plastic rheological model and represents the viscosity of a drilling fluid when extrapolated to infinite shear rate. The PV is determined by the difference between the viscometer readings at the 600 revolutions per minute (rpm) and the 300 rpm settings, for example, as shown in Table 4. For a drilling fluid, the PV value should be as small as possible. The value of PV will depend on the drilling fluid density. Fluids with a smaller PV can function in rapid drilling circumstances because, among other properties, such fluids have lesser viscosity upon exiting the drill bit and has an increased flow rate. An increase in PV may be caused by a viscous base fluid, excess colloidal solids, or both. YP is defined as the value obtained from the Bingham-Plastic rheological model when the yield stress is extrapolated to a shear rate of zero. YP is calculated by subtracting PV from the viscometer readings at the 300 rpm setting. YP is used to evaluate a drilling fluid's ability to lift small pieces of rock dislodged by the drill bit out of the annulus (the wellbore and casing or between casing and tubing, where the drilling fluid flows). Fluids with greater YP value can carry cuttings better than a fluid of similar density but lesser YP value. The YP/PV ratio is a significant indicator of drilling fluid condition and is useful for evaluating the stability of drilling fluids. The YP/PV ratio is also an indication of the carrying capacity of the drilling fluid and can help determine if the fluid should be recycled through the system. Gel strength is a measurement of the carrying capacity of the drilling fluid when the fluid is static or when the fluid is not moving in the borehole. Particle size affects interaction between the drilling fluid and the surrounding formation. Particles smaller than the pore size of the formation will bridge rock pores during mud circulation, leading to the formation of a filter cake that prevents the exit of fluids from the well during drilling. Mud weight is the term used to describe the density of a drilling fluid and is measured in pounds per cubic feet (pcf) by using a mud scale or a mud balance. In certain embodiments, barite is used to increase the density. Mud funnel viscosity describes the time, in seconds, for one quart of a drilling fluid to flow through a Marsh funnel and is a qualitative measure of how thick the drilling fluid is. Certain embodiments of the water-based drilling fluids containing treated calcium bentonite have a mud weight of 64 to 67 pcf, a mud funnel viscosity of 60-120 seconds, a pH greater than 10, a PV of less than 5 cP, and a YP of 25 to 35 $lbf/100 ft^2$.

EXAMPLES

The following examples are included to demonstrate embodiments of the disclosure, and should be considered nonlimiting. Certain examples represent techniques, systems, compositions, and apparatuses discovered to function well in the practice of the disclosure, and thus can be considered to constitute modes for its practice. Changes can be made to the embodiments disclosed in the examples without departing from the spirit and scope of the disclosure.

Example 1

A local bentonite sample obtained at 7 meters below the ground surface of the mining pit was treated as follows. About 0.5 grams (g) of soda ash (from Fisher Scientific headquartered in Waltham, Mass., USA) was mixed with 341 g of water for five minutes. Then, 15 ppb of the bentonite sample was added to the soda ash-containing slurry and the treated local bentonite mixture was mixed for about 20 minutes. About 2.5 ppb of starch was added and this mixture containing the starch and treated local bentonite was mixed for about 10 minutes. Then, 0.2 ppb of sodium hydroxide was added and the resulting treated local bentonite mixture was mixed for about 5 minutes. This addition of sodium hydroxide adjusted the pH of the treated local bentonite mixture to a pH greater than 10. The treated local bentonite mixture was hot rolled by placing the mixture in a pressurized high temperature and high pressure (HTHP) cell and rolled at 130 degrees Fahrenheit (° F.) for 16 hours. The reference bentonite was not treated and the rheological properties of the treated local bentonite mixture and the reference bentonite were evaluated.

Properties of the treated local bentonite mixture and the reference bentonite, such as viscosity and gel strength, were analyzed using a standard oilfield viscometer. An example of a standard oilfield viscometer can include a FANN® Model 35 Viscometer, available from Fann Instrument Company, headquartered in Houston, Tex., USA. Gel strength test used was according to the API Recommended Practice 13B-2 (RP 13B-2). The shear stress (scale or dial reading) is determined as a function of the shear rate (from the speed of rotation) and provided as centipoise (cP). The dial readings at different rotor sleeve speeds of 3, 6, 100, 200, 300 and 600 rpm are shown in Table 4. The treated local bentonite mixture and the reference bentonite were also characterized by evaluating ten-second and ten-minute gel strength. The ten-second gel test is performed using a FANN® viscometer and allowing the bentonites to rest for 10 seconds before measuring the peak shear stress at 3 rpm. The ten-minute gel test is performed using a FANN® viscometer and allowing the bentonites to rest for 10 minutes before measuring the peak shear stress at 3 rpm. Measurements from these tests provide an indication of the bentonites' ability to keep cuttings suspended. From the test data, PV, YP, and YP/PV were calculated and are shown in Table 4 for the treated local bentonite mixture and the reference bentonite.

TABLE 4

| Property | Treated local bentonite | Reference bentonite |
|---|---|---|
| 600 rpm (cP) | 23 | 29 |
| 300 rpm (cP) | 18 | 25 |
| 200 rpm (cP) | 15 | 21 |
| 100 rpm (cP) | 12 | 18 |
| 6 rpm (cP) | 9 | 14 |
| 3 rpm (cP) | 8 | 13 |
| Gel Strength, 10 sec, (lbf/100 ft$^2$) | 9 | 24 |
| Gel Strength, 10 min, (lbf/100 ft$^2$) | 13 | 15 |
| PV (lbf/100 ft$^2$) | 5 | 4 |
| YP (lbf/100 ft$^2$) | 13 | 21 |
| YP/PV | 2.6 | 5.25 |
| pH | 11.4 | 11 |
| Mud Weight, pcf | 64 | 64 |

The PV of the drilling fluid compositions containing the treated local bentonite and the reference bentonite did not change significantly as PV is dependent on the solid content of the composition and this parameter was adjusted in this experiment. However, the decreases in YP and YP/PV ratio are significant and will lead to better performing drilling fluids. A small YP/PV ratio indicates lesser tendency for gas cutting, swabbing pressure, and greater settling velocity of cuttings whereas larger ratios indicate coagulation and flocculation.

A fluid-loss test was conducted to determine the relative effectiveness of a drilling fluid to retain its water phase or to lose a portion of its water phase as a filtrate to the formation. The fluid-loss test performed here was the API low-pressure, low-temperature (LPLT) filtration test that measures the filtration of a drilling fluid at ambient temperature and differential pressure of 100 pounds per square inch (psi), performed according to specifications set by API Recommended Practice 13-B1, using a static filter press. These conditions were chosen as the water-based drilling compositions containing the treated local bentonites were developed for LTLP applications. The fluid loss test was performed using the drilling fluids containing the local bentonite sample and the reference bentonite sample, both treated as previously described in this Example 1. The samples were placed into the testing chamber of API fluid loss testing equipment (Fann® Series 300 API LPLT Filter Press). About 100 psi pressure was applied to the sample in the chamber and maintained for 30 minutes. The volume of filtrate was recorded at different time points, as presented in Table 5.

TABLE 5

| Test Parameter | Treated local bentonite | Reference bentonite |
|---|---|---|
| API fluid loss after 7.5 min, mL | 6 | 4 |
| API fluid loss after 30 min, mL | 12.5 | 8.5 |
| Difference Between 7.5 min and 30 min ($V_c$), mL | 6.5 | 4.5 |
| Filtrate Volume of the Suspension (2 · $V_c$), mL | 13 | 9 |

These results show that the treated local bentonite meets the industry standards and requirements in terms of physical specification. An example set of standards as set by the API for such tests is presented in Table 6. This YP/PV ratio of the treated local bentonite mixture was 2.6, less than the maximum of 3 per API standard. The filtrate volume as determined by the LPLT fluid-loss test was 13 mL, less than the maximum of 15 mL per API standard.

TABLE 6

| Requirement | Standard |
|---|---|
| Viscometer dial reading at 600 rpm | Minimum 30 |
| YP/PV Ratio | Maximum 3 |
| Filtrate Volume | Maximum 15 mL |
| Residue of diameter greater than 75µ | Maximum mass fraction 4% |

Example 2

Sieve analysis was performed to evaluate the bentonite sample obtained at 7 meters below the ground surface, treated as previously described in this Example 1. About 100 grams ($W_1$) of the treated local bentonite-containing mixture was subject to a sieve analysis using W.S. TYLER™ RO-TAP™ Sieving Lab Kits, available from W.S. Tyler, a Haver & Boecker company headquartered in Mentor, Ohio. The sample is placed in a RO-TAP® Electronic Test Sieve Shaker Model E, available from W.S. Tyler, a Haver & Boecker company headquartered in Mentor, Ohio. This shaker has a two-dimensional operation: horizontal, circular motion and a vertical, tapping motion which allows particles of the bentonite sample to pass through different-sized sieves. The retained solids were transferred to a dish, whose weight has been weighed to nearest 0.01 g ($W_2$). The dish containing the retained solids is weighted to the nearest 0.01 g (W3). The recorded test results are presented in Table 7.

TABLE 7

| Test parameter | Value |
|---|---|
| Bentonite sample weight $W_1$, (g) | 100 |
| 100 Mesh screen (dish) weight $W_2$, (g) | 332.71 |
| Retained solids and 100 mesh screen (dish) weight $W_3$, (g) | 332.84 |
| Residue (weight %) on top of 100 mesh screen ($W_3 - W_2$)/$W_1$ | 0.13 |

These sieve analysis of the treated local bentonite mixture from the bentonite sample obtained at 7 meters below the ground surface had a 0.13% mass fraction left on top of the 100 Mesh Screen. This amount of residue meets the industry standards and requirements in terms of physical specification of the amount of residue (see Table 6) set by the API.

Example 3

A bentonite sample obtained at 7 meters below the ground surface of the mining pit was treated as follows. About 0.5 g of soda ash and 0.5 g of magnesium oxide (98% purity and from Sigma-Aldrich Corporation, headquartered in St. Louis, Mo., United States) were mixed with 341 g of water for five minutes. Then, 20 g of the bentonite sample was added to the magnesium oxide-containing slurry and the aqueous mixture was mixed for about 20 minutes. About 2.5 g of starch was added and this mixture was mixed for about 10 minutes. Then, 0.2 g of sodium hydroxide was added and the resulting drilling fluid was mixed for about 5 minutes. This addition of sodium hydroxide adjusted the pH of the aqueous bentonite mixture to a pH greater than 10. This drilling fluid containing the treated local bentonite was hot rolled by placing the mixture in a HTHP cell and rolled at 130° F. for 16 hours. A drilling fluid was prepared by using the reference bentonite that was not treated and the rheological properties of both samples were evaluated.

Properties of these drilling fluid formulations, such as viscosity and gel strength, were analyzed using a standard oilfield viscometer, as previously described in Example 1. The dial readings at different rotor sleeve speeds of 3, 6, 100, 200, 300 and 600 rpm for tests using the two drilling fluids of this Example 3 are shown in Table 8. These drilling fluids were also characterized by evaluating their ten-second and ten-minute gel strength. From the test data, PV, YP, and YP/PV were calculated and are shown in Table 8 for the drilling fluids containing the treated local bentonite and the reference bentonite.

TABLE 8

| Property | Treated local bentonite | Reference bentonite |
|---|---|---|
| 600 rpm (cP) | 66 | 78 |
| 300 rpm (cP) | 60 | 72 |
| 200 rpm (cP) | 58 | 65 |
| 100 rpm (cP) | 56 | 64 |
| 6 rpm (cP) | 47 | 61 |
| 3 rpm (cP) | 45 | 60 |
| Gel Strength, 10 sec, (lbf/100 ft$^2$) | 55 | 78 |
| Gel strength, 10 min, (lbf/100 ft$^2$) | 90 | 112 |
| PV (lbf/100 ft$^2$) | 6 | 6 |
| YP (lbf/100 ft$^2$) | 54 | 66 |
| YP/PV | 9 | 11 |
| pH | 11.09 | 11.6 |

The PV of the drilling fluid compositions containing the treated local bentonite and the reference bentonite did not change significantly as PV is dependent on the solid content of the composition and this parameter was adjusted in this experiment. However, the decreases in YP and YP/PV ratio are significant and will lead to better performing drilling fluids.

The fluid loss test was performed using the drilling fluids containing the local bentonite and the reference bentonite, both treated as previously described in this Example 3. The API low-pressure, low-temperature filtration test was performed as previously described in Example 1. The volume of filtrate was as presented in Table 9. The filtrate volume as determined by the LPLT fluid-loss test was 15 mL, which is the maximum per API standard.

TABLE 9

| Test parameter | Treated local bentonite | Reference bentonite |
|---|---|---|
| API fluid loss after 7.5 min, mL | 5 | 4 |
| API fluid loss after 30 min, mL | 12.5 | 9 |
| Difference between 7.5 min and 30 min (V$_c$), mL | 7.5 | 5 |
| Filtrate volume of the suspension (2 · V$_c$), mL | 15 | 10 |

Example 4

A bentonite sample obtained at 7 meters below the ground surface of the mining pit was treated as follows. About 25 g of the bentonite sample was mixed with 341 g of water, followed by the addition of 0.5 g of soda ash and 2.5 g of starch to form an aqueous bentonite-based mixture. Then, 0.2 g of sodium hydroxide was added and the resulting drilling fluid was mixed for about 5 minutes. This addition of sodium hydroxide adjusted the pH of the drilling fluid to a pH greater than 10. One sample of the drilling fluid containing the treated local bentonite was hot rolled by placing the mixture in a HTHP cell and rolled at 130° F. for 16 hours. Another sample of the drilling fluid containing the treated local bentonite mixture was not subject to hot-rolling. A drilling fluid was prepared by using the reference bentonite that was also similarly treated and this drilling fluid was also not subject to hot-rolling. The rheological properties of all three samples were evaluated. Evaluating the bentonite-containing compositions at room temperature facilitates the understanding of the change in rheology with temperature (from room temperature to 130° F.). Understanding the rheology of the bentonite-containing compositions at room temperature assists with evaluating the applicability of using the drilling fluid in a shallow hole section in hydrocarbon wells.

Properties of these drilling fluid formulations, such as viscosity and gel strength, were analyzed using a standard oilfield viscometer, as previously described in Example 1. The dial readings at different rotor sleeve speeds of 3, 6, 100, 200, 300 and 600 rpm for tests using the bentonite-based drilling fluids of Example 4 are shown in Table 10. These drilling fluids were also characterized by evaluating their ten-second and ten-minute gel strength. From the test data, PV, YP, and YP/PV were calculated and are shown in Table 10 for the drilling fluids containing the treated local bentonites and the reference bentonite.

TABLE 10

| Property | Treated local bentonite (room temperature) | Treated local bentonite (130° F.) | Reference bentonite (room temperature) |
|---|---|---|---|
| 600 rpm (cP) | 45 | 59 | 102 |
| 300 rpm (cP) | 43 | 47 | 80 |
| 200 rpm (cP) | 39 | 43 | 69 |
| 100 rpm (cP) | 37 | 40 | 58 |
| 6 rpm (cP) | 31 | 34 | 38 |
| 3 rpm (cP) | 29 | 31 | 36 |
| Gel strength, 10 sec, (lbf/100 ft$^2$) | 20 | 28 | 45 |
| Gel strength, 10 min, (lbf/100 ft$^2$) | 35 | 40 | 72 |
| PV (lbf/100 ft$^2$) | 2 | 6 | 22 |
| YP (lbf/100 ft$^2$) | 41 | 41 | 58 |
| YP/PV | 21 | 7 | 3 |

The fluid loss test was performed using the drilling fluid containing the local bentonite and the reference bentonite, treated as previously described in this Example 4. These samples were not subjected to a hot-rolling process. The API low-pressure, low-temperature filtration test was performed as previously described in Example 1. The volume of filtrate was recorded at different time points, as presented in Table 11. The filtrate volume as determined by the LPLT fluid-loss test was 15 mL, which is the maximum per API standard.

TABLE 11

| Test parameter | Treated local bentonite |
|---|---|
| API fluid loss after 7.5 min, mL | 7 |
| API fluid loss after 30 min, mL | 14.5 |
| Difference between 7.5 min and 30 min ($V_c$), mL | 7.5 |
| Filtrate volume of the suspension (2 · $V_c$), mL | 15 |

Example 5

A bentonite sample obtained at 7 meters below the ground surface of the mining pit was treated as follows. About 25 g of the bentonite sample was mixed with 341 g of water, followed by the addition of 0.5 g of soda ash and 2.5 g of starch to form an aqueous bentonite-based mixture. Then, 0.2 g of sodium hydroxide was added and the resulting drilling fluid was mixed for about 5 minutes. The addition of sodium hydroxide adjusted the pH of the drilling fluid to a pH greater than 10. This drilling fluid containing the treated local bentonite mixture was hot rolled by placing the mixture in a HTHP cell and rolled at 120° F. for 16 hours. A drilling fluid was prepared by using the reference bentonite that was also similarly treated and the rheological properties of both samples were evaluated.

Properties of these drilling fluid formulations, such as viscosity and gel strength, were analyzed using a standard oilfield viscometer, as previously described in Example 1. The dial readings at different rotor sleeve speeds of 3, 6, 100, 200, 300 and 600 rpm for tests using the bentonite-based drilling fluids of Example 5 are shown in Table 12. These drilling fluids were also characterized by evaluating their ten-second and ten-minute gel strength. From the test data, PV, YP, and YP/PV were calculated and are shown in Table 12 for the drilling fluids containing the treated local bentonite and the reference bentonite.

TABLE 12

| Property | Treated local bentonite | Reference bentonite |
|---|---|---|
| 600 rpm (cP) | 110 | 119 |
| 300 rpm (cP) | 89 | 80 |
| 200 rpm (cP) | 76 | 70 |
| 100 rpm (cP) | 63 | 55 |
| 6 rpm (cP) | 43 | 35 |
| 3 rpm (cP) | 41 | 33 |
| Gel strength, 10 sec, (lbf/100 ft$^2$) | 48 | 54 |
| Gel strength, 10 min, (lbf/100 ft$^2$) | 79 | 88 |
| PV (lbf/100 ft$^2$) | 21 | 39 |
| YP (lbf/100 ft$^2$) | 68 | 41 |
| YP/PV | 3 | 1 |

These results show that the drilling formulation containing a greater amount of the treated local bentonite meets the example set of standards as set by the American Petroleum Institute (API) and presented in Table 12. API standards require viscometer dial reading at 600 rpm to be at a minimum of 30 and the YP/PV ratio to be a maximum of 3. The composition prepared according to this Example 5 has a viscometer dial reading at 600 rpm of 110 and the YP/PV ratio of 3.

The fluid loss test was performed using for the drilling fluids containing the local bentonites and the reference bentonite, treated as previously described in this Example 5. The API low-pressure, low-temperature filtration test was performed as previously described in Example 1. The volume of filtrate was recorded at different time points, as presented in Table 13. The filtrate volume as determined by the LPLT fluid-loss test was 1 mL as compared to the maximum of 15 mL per API standard.

TABLE 13

| Test parameter | Treated local bentonite | Reference bentonite |
|---|---|---|
| API fluid loss after 7.5 min, mL | 5 | 4.5 |
| API fluid loss after 22.5 min, mL | 5.5 | 5 |
| Difference between 7.5 min and 22.5 min ($V_c$), mL | 0.5 | 0.5 |
| Filtrate volume of the suspension (2 · Vc), mL | 1 | 1 |

Therefore, drilling fluids containing the treated local bentonites performed as well as the drilling fluids containing the reference bentonites.

As used herein and in the appended claims, the words "comprise," "has," and "include" and all grammatical variations thereof are each intended to have an open, nonlimiting meaning that does not exclude additional elements or steps.

Where the specification or the appended claims provide a range of values, it is understood that the interval encompasses each intervening value between the upper limit and the lower limit as well as the upper limit and the lower limit. The present disclosure encompasses and bounds smaller ranges of the interval subject to any specific exclusion provided. Where the specification and appended claims reference a method comprising two or more defined steps, the defined steps can be carried out in any order or simultaneously except where the context excludes that possibility.

In the drawings and specification, there have been disclosed embodiments of compositions of and methods for treating bentonite, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

We claim:

1. A method of preparing a treated bentonite mixture, the method comprising the steps of:
    a) mixing calcium bentonite and an aqueous mixture containing soda ash to form a first bentonite mixture, wherein the calcium bentonite contains 67 weight percent (wt %) of sodium montmorillonite, 10 wt % of kaolinite, and 23 wt % of quartz; then
    b) adding starch to the first bentonite mixture to form a second bentonite mixture; and then
    c) adding sodium hydroxide to the second bentonite mixture such that the pH is adjusted to a pH greater than 10 to form a treated bentonite mixture.

2. The method of claim 1, wherein the step of a) mixing calcium bentonite and the aqueous mixture does not involve addition of hydroxide compounds.

3. The method of claim 1, wherein the step of a) mixing calcium bentonite and the aqueous mixture does not involve addition of heavy metal salts.

4. A method of preparing a treated bentonite mixture, the method comprising the steps of:
   a) mixing calcium bentonite and an aqueous mixture containing soda ash to form a first bentonite mixture, wherein the calcium bentonite contains 64 weight percent (wt %) of sodium montmorillonite, 3 wt % of illite, 9 wt % of kaolinite, 21 wt % of quartz, 1 wt % of calcite and 2 wt % of hematite; then
   b) adding starch to the first bentonite mixture to form a second bentonite mixture; and then
   c) adding sodium hydroxide to the second bentonite mixture such that the pH is adjusted to a pH greater than 10 to form a treated bentonite mixture.

5. A method of preparing a treated bentonite mixture, the method comprising the steps of:
   a) mixing calcium bentonite and an aqueous mixture containing soda ash to form a first bentonite mixture, wherein the calcium bentonite contains 56 weight percent (wt %) of sodium montmorillonite, 4 wt % of illite, 8 wt % of kaolinite, 21 wt % of quartz, 2 wt % of albite and 9 wt % of hematite; then
   b) adding starch to the first bentonite mixture to form a second bentonite mixture; and then
   c) adding sodium hydroxide to the second bentonite mixture such that the pH is adjusted to a pH greater than 10 to form a treated bentonite mixture.

6. The method of claim 4, wherein the step of a) mixing calcium bentonite and the aqueous mixture does not involve addition of hydroxide compounds.

7. The method of claim 4, wherein the step of a) mixing calcium bentonite and the aqueous mixture does not involve addition of heavy metal salts.

8. The method of claim 5, wherein the step of a) mixing calcium bentonite and the aqueous mixture does not involve addition of hydroxide compounds.

9. The method of claim 5, wherein the step of a) mixing calcium bentonite and the aqueous mixture does not involve addition of heavy metal salts.

* * * * *